(12) United States Patent
Hsiung et al.

(10) Patent No.: US 8,011,791 B2
(45) Date of Patent: Sep. 6, 2011

(54) LIGHT-FILTERING MODULE AND PROJECTING SYSTEM APPLIED THEREWITH

(75) Inventors: Chien-Chih Hsiung, Taichung (TW); Tzu-Lung Wu, Taichung (TW); Keng-Hui Lin, Taichung (TW); Wen-Lang Hung, Taichung (TW); Wei-Hsiang Peng, Taichung (TW); Chao-Yang Ke, Taichung (TW); Yi-Chung Hung, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 441 days.

(21) Appl. No.: 12/243,304

(22) Filed: Oct. 1, 2008

(65) Prior Publication Data
US 2009/0109408 A1    Apr. 30, 2009

(30) Foreign Application Priority Data

Oct. 24, 2007   (TW) ............................... 96139869 A

(51) Int. Cl.
*G03B 21/14* (2006.01)
*G03B 21/32* (2006.01)
*G02B 5/22* (2006.01)
*G02B 27/14* (2006.01)

(52) U.S. Cl. .............. 353/84; 353/20; 352/42; 359/889; 359/892; 359/634

(58) Field of Classification Search .................... 353/84, 353/20; 352/42; 359/885, 889, 892, 502, 359/490, 634, 855; 348/339
See application file for complete search history.

(56) References Cited

U.S. PATENT DOCUMENTS
6,783,244 B1 * 8/2004 Okuyama et al. ............... 353/57
7,029,127 B2 * 4/2006 Ogawa et al. ................... 353/84
7,287,860 B2 * 10/2007 Yoshida et al. ................. 353/31

* cited by examiner

*Primary Examiner* — Georgia Y Epps
*Assistant Examiner* — Magda Cruz
(74) *Attorney, Agent, or Firm* — Thomas|Kayden

(57) ABSTRACT

A light-filtering module includes a light-source module, a dichroic mirror and a first image unit. The light-source module outputs a light beam. The dichroic mirror divides the light beam into a first colored light and a dual colored light. The first image unit provides the first colored light with image information. The light-filtering module includes a light-filtering unit and a driving unit. The light-filtering unit is located between the dichroic mirror and the first image unit is located at a light path of the first colored light. The driving unit includes a coupling element coupled to the light-filtering unit and a driving element utilized to drive the coupling element. The driving element drives the light-filtering unit, switching between a first status and a second status by the coupling element. A wide-wavelength spectrum and a narrow-wavelength spectrum are provided when the light-filtering unit is in the first and second statuses, respectively.

20 Claims, 6 Drawing Sheets

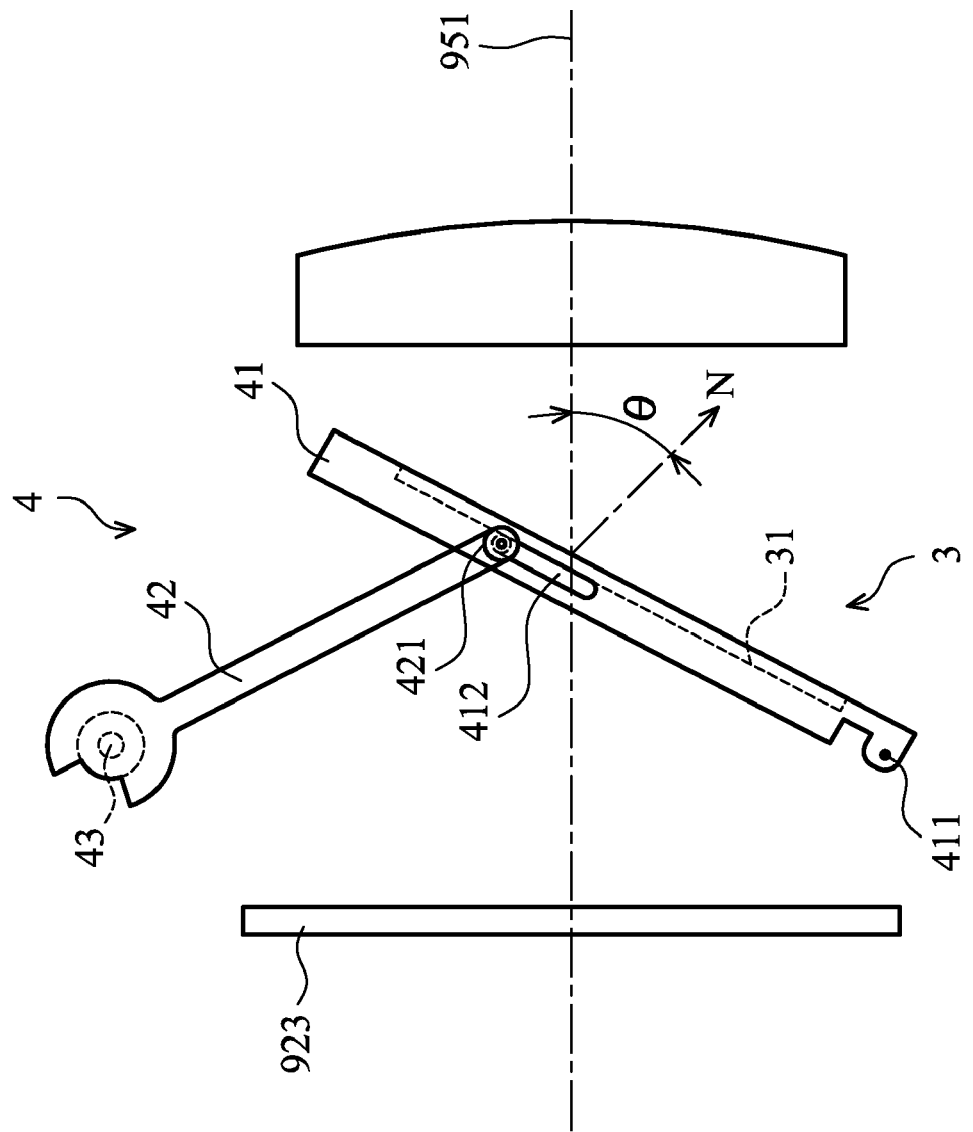

US 8,011,791 B2

LIGHT-FILTERING MODULE AND PROJECTING SYSTEM APPLIED THEREWITH

CROSS REFERENCE TO RELATED APPLICATIONS

This Application claims priority of Taiwan Patent Application No. 096139869, filed on Oct. 24, 2007, the entirety of which is incorporated by reference herein.

BACKGROUND OF THE INVENTION

1. Field of the Invention

The invention relates to a light-filtering module, and more particularly to a light-filtering module applied in a projecting system.

2. Description of the Related Art

When projectors are in use, output effects are required for particular situations, such as home theatre projectors with real color and brief report projectors with high brightness.

FIG. 1 is a spectrum energy distribution diagram of a UHP light source. For visible light within the range between 380-780 nm wavelength, two high energy peaks of 550 nm wavelength of green light and 570 nm wavelength of yellow light, are characterized with the following features when used in projectors for different applications.

For home-theatre projectors to approach real color, a precise color performance and green light precisely purified by filters are required. Thus, the filters are configured to block 570 nm wavelength of yellow light, i.e., allowing penetration of 550 nm wavelength of green light. Because 570 nm wavelength of yellow light is being neglected, brightness of home-theatre projectors is therefore lowered.

For brief-report projectors to be used by several users at the same time, a high brightness output is required. Thus, the filters are configured to block 550 nm wavelength of green light, i.e., allowing penetration of 570 nm wavelength of yellow light. Because 570 nm wavelength of yellow light is allowed to penetrate, brightness of brief-report projectors can be increased. However, due to 550 nm wavelength of green light contained with the yellow light, color performance of brief-report projectors may be hindered, as the green light contained with the yellow light is incorporated with lights containing real colors.

Based on the described features of the home-theatre and brief-report projectors, there is no projector capable of providing precise color performance and high brightness output.

BRIEF SUMMARY OF THE INVENTION

To provide precise color performance and high brightness output in a projector, the invention provides a light-filtering module applied in a projecting system, capable of providing conversion of high-brightness output mode and a precise-color output mode. The projecting system comprises a light-source module, a dichroic mirror and a first image unit. The light-source module outputs a light beam. The dichroic mirror divides the light beam into a first colored light and a dual colored light. The first image unit provides the first colored light with image information. The light-filtering module comprises a light-filtering unit and a driving unit. The light-filtering unit located between the dichroic mirror and the first image unit is located at a light path of the first colored light. The driving unit comprises a coupling element coupled to the light-filtering unit and a driving element utilized to drive the coupling element. The driving element drives the light-filtering unit to be switched between a first status and a second status by the coupling element, and a wide-wavelength spectrum and a narrow-wavelength spectrum are provided when the light-filtering unit is in the first and second statuses, respectively.

The invention is characterized in that the light-filtering unit can be switched between the first status capable of allowing penetration of the wide-wavelength spectrum and the second status capable of allowing penetration of the narrow-wavelength spectrum by the controlled driving unit. When the light-filtering unit is in the first status, the wide-wavelength spectrum is allowed to penetrate the light-filtering unit, and the two high energy peaks of the first colored light are allowed to penetrate the light-filtering unit, thus, obtaining the high brightness output. When the light-filtering unit is in the second status, the narrow-wavelength spectrum is allowed to penetrate the light-filtering unit, and only the high energy peak of green light within the first colored light is allowed to penetrate the light-filtering units and provide precise wavelength, thus, obtaining precise color output while incorporating with other colored lights. Thus, conversion of high-brightness output mode and a precise-color output mode is obtained by the light-filtering module applied in the projecting system.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6 is a side view of a driving unit of the light-filtering module of the second embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Note that the same elements in the following embodiments are marked by the same reference numbers.

Figure 2:
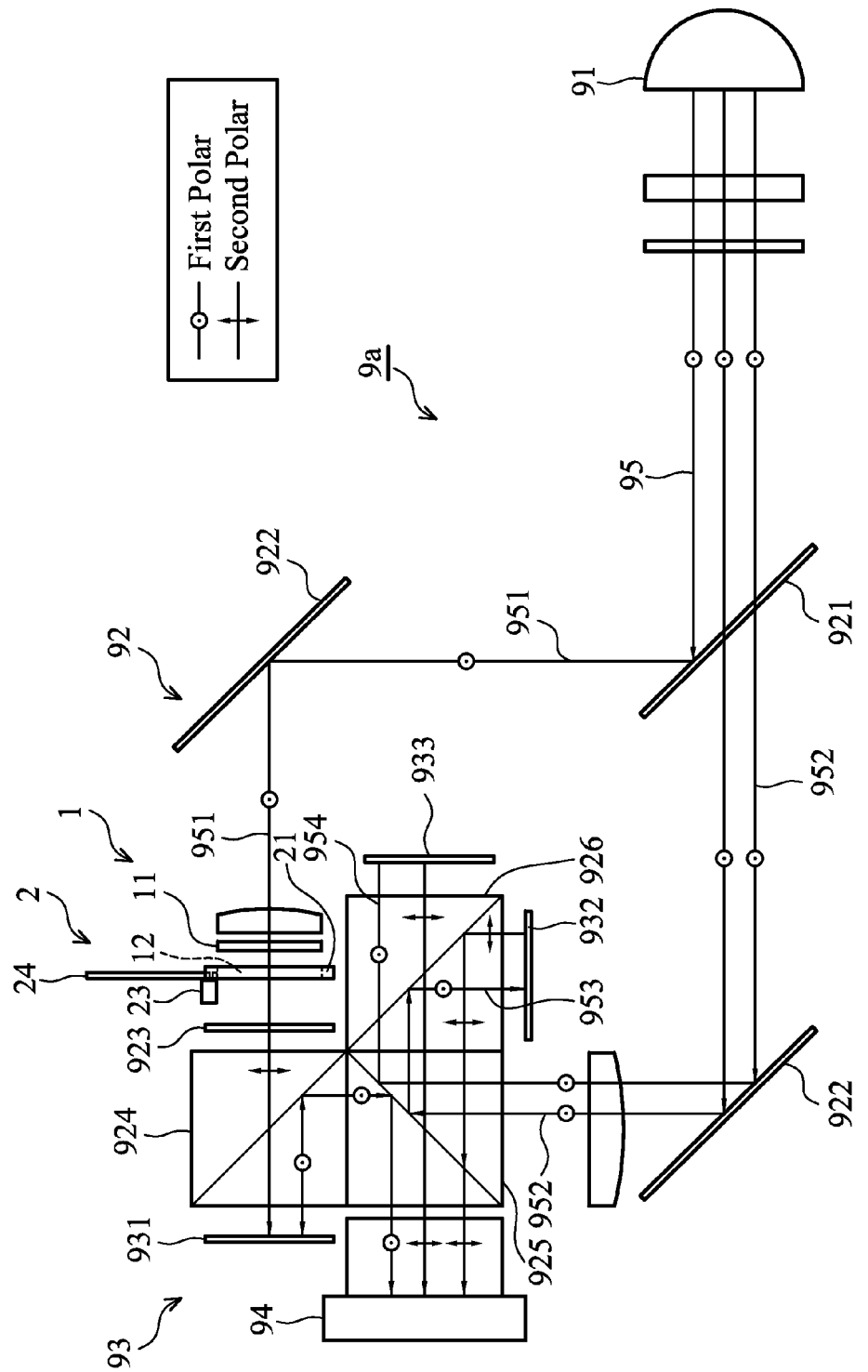
FIG. 2 is a top view of a light-filtering module of a first embodiment of the invention, applied in a projecting system.
Figure 3:
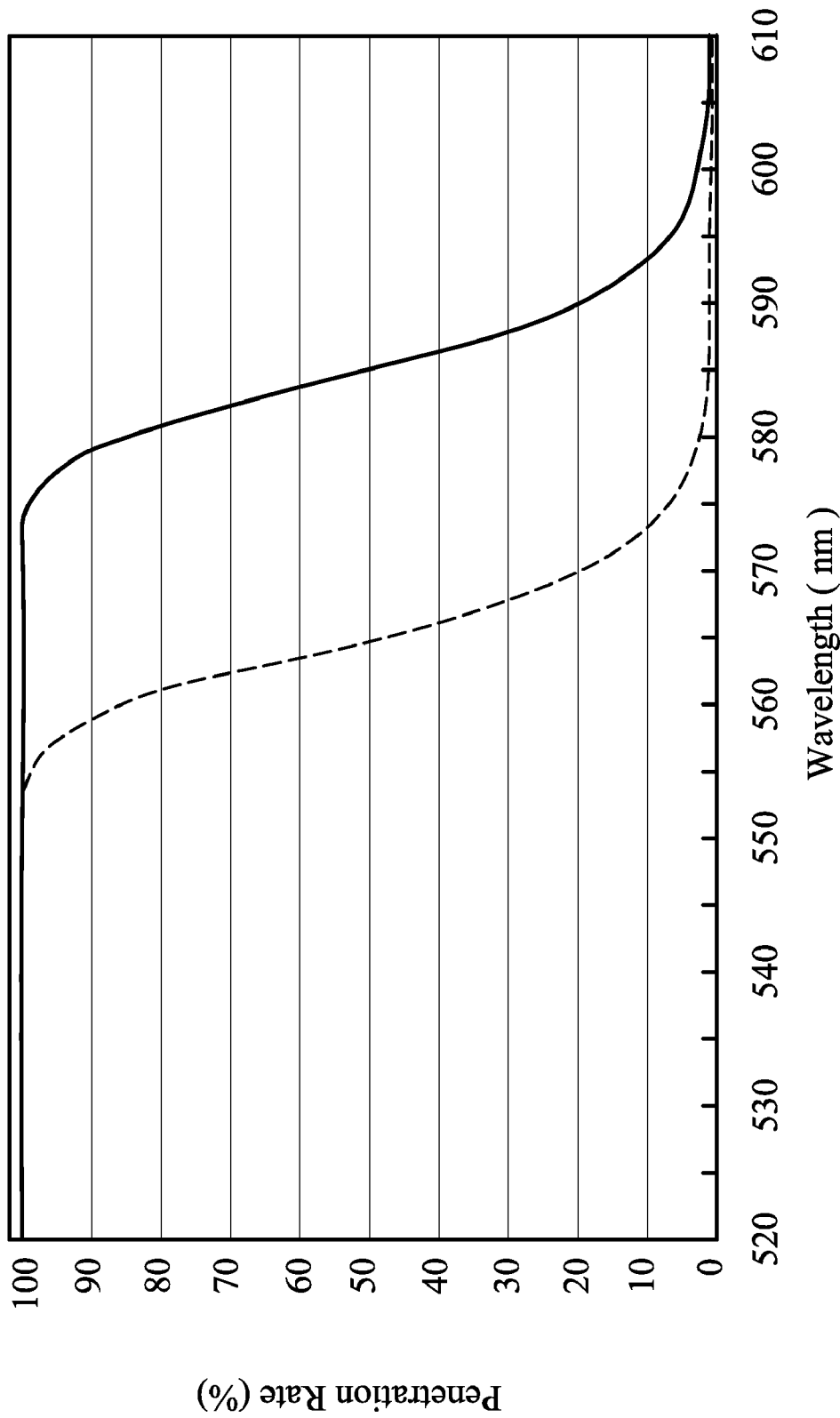
FIG. 3 is a schematic view of penetration rate of each wavelength, representing the filtering characteristics of a light-filtering unit of the first embodiment.

In FIGS. 2 and 3, a light-filtering module of a first embodiment is applied in a projecting system 9a. The projecting system 9a comprises a light-source module 91, a light-management module 92, a signal module 93 and a projecting lens 94.

The light-source module 91 outputs a white light beam 95 characterized with a first polar. The light-management module 92 comprises a dichroic mirror 921, a plurality of reflecting parts 922, a phase plate 923, a first polar beam-splitter 924, a second polar beam-splitter 925 and a dichroic prism 926. The dichroic mirror 921 is utilized to divide the white light beam 95 into a first colored light 951 and a dual colored light 952. The reflecting parts 922 are utilized to reflect the first colored light 951 and the dual colored light 952, respectively. The first colored light 951 characterized with the first polar is converted into the first colored light 951 characterized with the second polar by the phase plate 923, and the first colored light 951 characterized with a second polar is inputted to the first polar beam-splitter 924. The dual colored light 952 characterized with the first polar is inputted to the second polar beam-splitter 925 adhered on the first polar beam-splitter 924. The dichroic prism 926 adhered on the second polar beam-splitter 925 is utilized to divide the dual colored light 952 into a second colored light 953 and a third colored light 954.

The signal module 93 comprises a first image unit 931, a second image unit 932 and a third image unit 933. The first image unit 931 disposed next to the first polar beam-splitter 924 is utilized to convert the first colored light 951 characterized with the second polar into the first colored light 951 characterized with the first polar. The second and third image units 932 and 933 disposed next to the dichroic prism 926 are utilized to convert the second and third colored lights 953 and 954 characterized with the first polar into the second and third colored lights 953 and 954 characterized with the second polar, respectively. The first, second and third image units 931, 932 and 933 provide the corresponding first, second and third colored light 951, 953 and 954 with image information.

The projecting lens 94 disposed next to the second polar beam-splitter 925 is utilized to provide the second polar beam-splitter 925 for projecting the first, second and third colored light 951, 953 and 954 contained with image information therein. In this embodiment, the first, second and third colored light 951, 953 and 954 are primary green, blue and red lights, respectively.

The light-filtering module applied in a projecting system 9a comprises a light-filtering unit 1 and a driving unit 2. The light-filtering unit 1, located between the dichroic mirror 921 and the first image unit 931 and located at a light path of the first colored light 951, comprises a front light filtering sheet 11 and a rear light filtering sheet 12. The front light filtering sheet 11 is suitable to be penetrated by a first wavelength range spectrum and the rear light filtering sheet 12 is suitable to be penetrated by a second wavelength range spectrum. That is, the front light filtering sheet 11 can provide the first wavelength range, and the rear light filtering sheet 12 can provide the second wavelength range. In the first embodiment corresponding to an energy distribution diagram of a present UHP light source shown in FIG. 1, the first wavelength range spectrum and the second wavelength range spectrum can be obtained as real and phantom lines shown in FIG. 3, respectively. Thus, the first wavelength range of the first wavelength spectrum is wider than the second wavelength range of the second wavelength spectrum.

Figure 4:
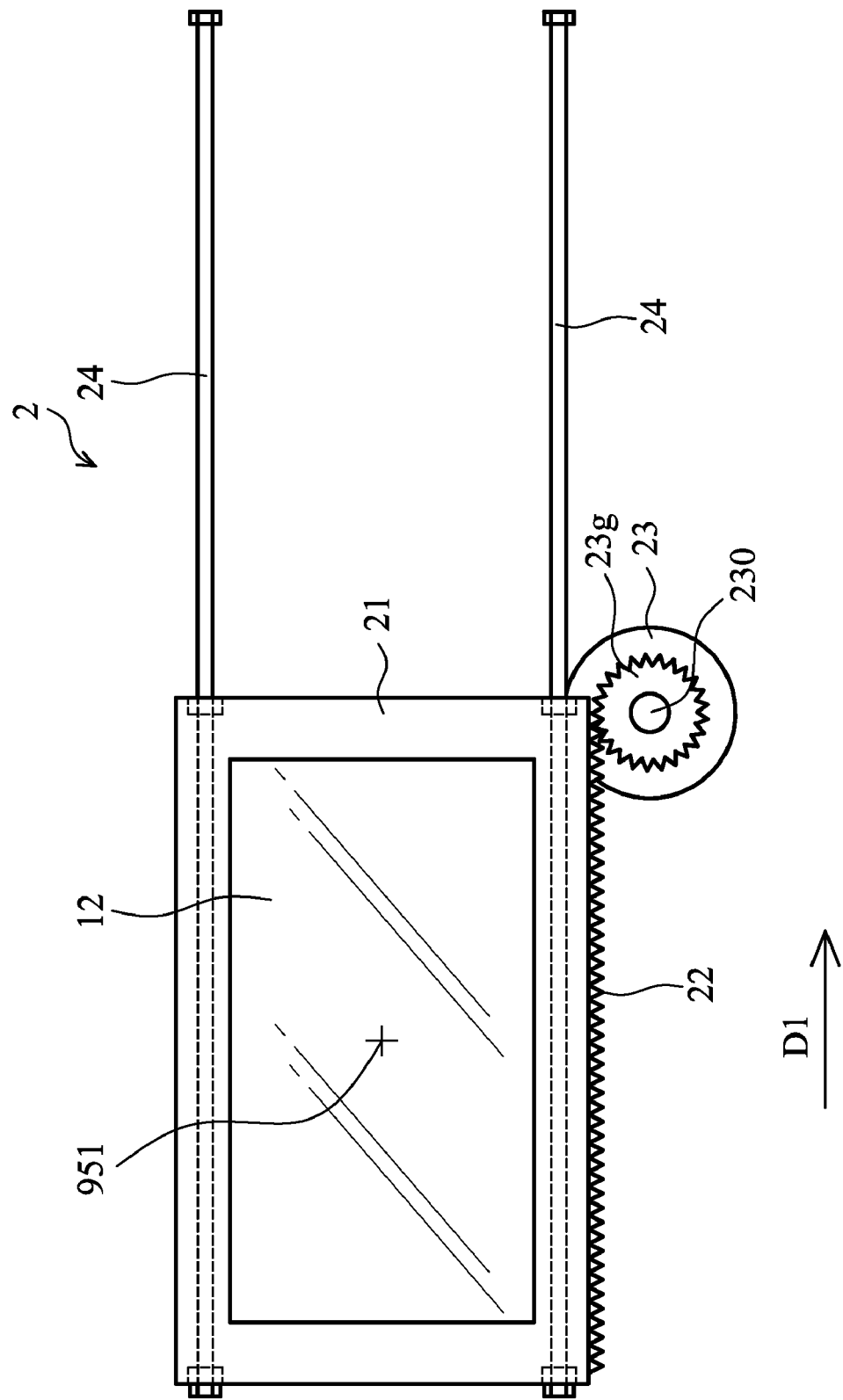
FIG. 4 is a side view of a driving unit of the light-filtering module of the first embodiment.

Referring to FIG. 4, the driving unit 2 comprises a frame 21, a coupling element 22, a driving element 23 and two rails 24. The frame 21 is provided for installation of the rear light filtering sheet 12. The coupling element 22 is coupled to the rear light filtering sheet 12 of the light-filtering unit 1. The driving element 23 is utilized to drive the coupling element 22, thereby switching the driven light-filtering unit 1 between a first status and a second status. Thus, the light-filtering unit 1 situated in the first and second statuses can provide a wide-wavelength spectrum and a narrow-wavelength spectrum, respectively. The rails 24 are utilized to slidably guide the frame 21 and the rear light filtering sheet 12. In the first embodiment, the coupling element 22 is a gear rack disposed on the frame 21 and motionally driven by the driving element 23, the driving element 23 is a motor utilized to drive the coupling element 22 to be reciprocally moved, and the motor has a spindle connected to the gear 23g engaged to the gear rack.

The following description is conversion of high-brightness output mode and a precise-color output mode provided by the projecting system 9a of the first embodiment.

In FIG. 4, when the output mode of the projecting system 9a determined by the user is the high-brightness output mode, the controlled driving element 23 is rotated to drive the rear light filtering sheet 12 to be linearly moved via the coupling element 22, thereby removing the rear light filtering sheet 12 from the light path of the first colored light 951 along direction D1. Thus, only the front light filtering sheet 11 of the light-filtering unit 1 is located at the light path of the first colored light 951. Further, being caused by the first wavelength range spectrum corresponding to the front light filtering sheet 11, two high energy peaks of 550 nm wavelength of green light and 570 nm wavelength of yellow light shown in FIG. 1 pass the front light filtering sheet 11 and are directly output to the following phase plate 923. Based on the description above, it is understood that the light-filtering unit 1 presently is defined in the first status, allowing for penetration of the wide-wavelength spectrum, i.e., high energy peak of 550 nm wavelength is allowed to penetrate the light-filtering unit 1. Thus, the brightness output of the projecting system 9a is increased, forming the high brightness output.

When the output mode of the projecting system 9a determined by the user is changed to the precise-color output mode from the high-brightness output mode, the coupling element 22 is reversely moved, moving the rear light filtering sheet 12 back to the light path of the first colored light 951 via the coupling element 22, as shown in FIG. 2, and the front light filtering sheet 11 and the rear light filtering sheet 12 of the light-filtering unit 1 are located at the light path of the first colored light 951. Although the high energy peaks of 550 nm wavelength of green light and 570 nm wavelength of yellow light, corresponding to the first wavelength range spectrum of the front light filtering sheet 11, are capable of penetrating the front light filtering sheet 11, the high energy peak of 570 nm wavelength of yellow light, when reaching the rear light filtering sheet 12, is not allowed to penetrate the rear light filtering sheet 12 due to not corresponding to the second wavelength range spectrum of the rear light filtering sheet 12. That is, only the high energy peak of 550 nm wavelength of green light, capable of penetrating the front and rear light filtering sheets 11 and 12 can be directly output to the following phase plate 923. Based on the description above, it is understood that the light-filtering unit 1 presently is defined in the second status, allowing for penetration of the narrow-wavelength spectrum, i.e. the high energy peak of 550 nm wavelength is allowed to penetrate the light-filtering unit 1, thus purifying the green light output of the projecting system 9a and obtaining precise color output while incorporating with other colored lights.

In the first embodiment, with respect to the light path of the first colored light 951, it is noted that the front and rear light filtering sheets 11 and 12 located at the light path of the first colored light 951 and adjacently arranged apart are disposed ahead of the phase plate 923. Although this arrangement of the front and rear light filtering sheets 11 and 12 is not allowed for a limited space, the front and rear light filtering sheets 11 and 12 located at the light path of the first colored light 951 can be taken apart for disposal at different positions, e.g. rear or front, with respect to other optical components, and conversion of a high-brightness output mode and a precise-color output mode provided by the projecting system 9a can still be provided. Further, in the first embodiment, the first wavelength range of the first wavelength spectrum is wider than the second wavelength range of the second wavelength spectrum. The conversion of the high-brightness output mode and precise-color output mode provided by the projecting system 9a can still be provided if the driving unit 2 is connected to the front light filtering sheet 11.

Figure 5:
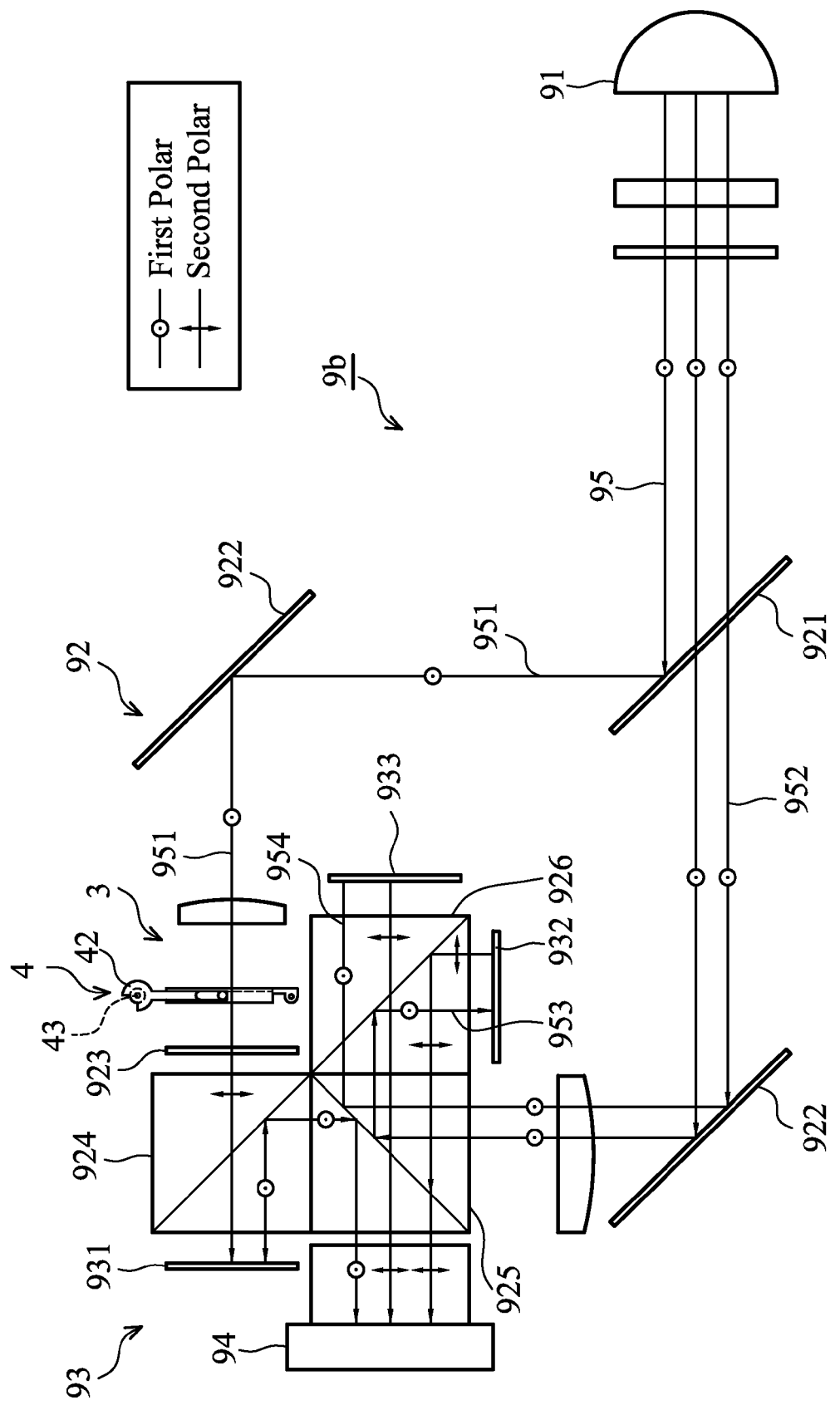
FIG. 5 is a top view of a light-filtering module of a second embodiment of the invention, applied in a projecting system.

In FIGS. 5 and 6, a light-filtering module applied in a projecting system 9b of a second embodiment differs from the light-filtering module of the first embodiment in that a light-filtering unit 3 comprises only a band-pass filter 31 and a driving unit 4 is utilized to vary the angle of the band-pass filter 31 with respect to the light path of the first colored light 951, thereby providing conversion of a high-brightness output mode and a precise-color output mode. The band-pass filter 31 is provided with a normal line N.

The light-filtering unit 3, disposed between the dichroic mirror 921 and the first image unit 931 as well as located at the light path of the first colored light 951, comprises the band-pass filter 31 providing a wide-wavelength spectrum to be penetrated. In FIG. 3, a solid line represents a spectrum energy distribution diagram of the UHP light source of FIG. 1.

The driving unit 4 comprises a frame 41, a coupling element 42, and a driving element 43. The frame 41 is provided for installation of the band-pass filter 31. The coupling element 42 is coupled to the band-pass filter 31 of the light-filtering unit 3 via the frame 41. The frame 41 comprises a supporting portion 411 and a slot 412. The driving element 43 is utilized to drive the coupling element 42. In this embodiment, the coupling element 42 is a cam lever having an end 421 coupled to the slot 412 of the frame 41, and the driving element 43 is a motor utilized to drive the coupling element 42.

The following description is directed to the conversion of the high-brightness output mode and precise-color output mode provided by the projecting system 9b of the second embodiment.

Figure 1:
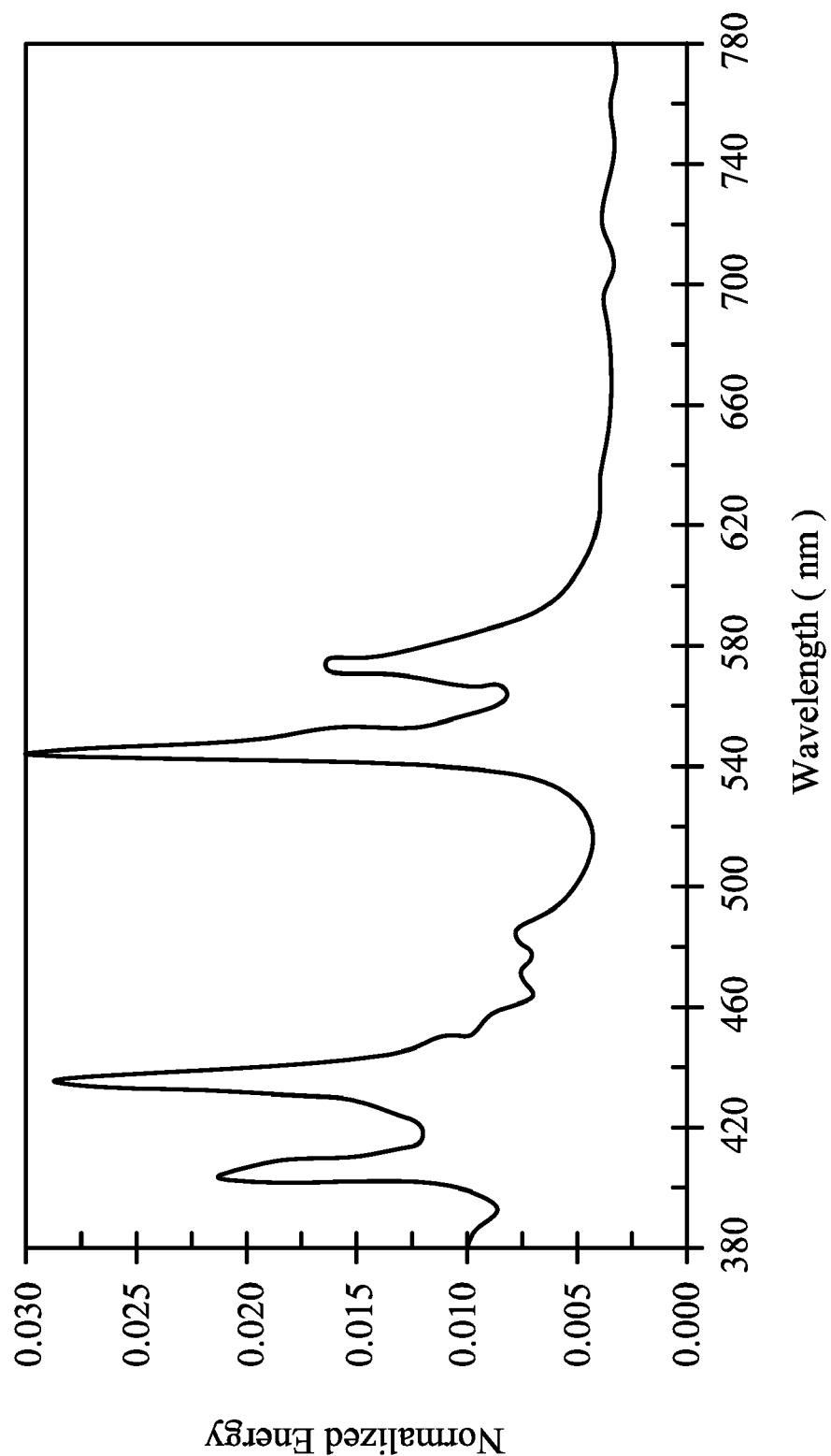
FIG. 1 is a spectrum energy distribution diagram of an UHP light source.

In FIG. 5, when the output mode of the projecting system 9b determined by the user is the high-brightness output mode, the coupling element 42 driven by the driving element 43 is rotated, moving the end 421 thereof along the slot 412 of the frame 41 to approach the supporting portion 411 of the frame 41, to cause the band-pass filter 31 to be disposed on the frame 41 perpendicular to the light path of the first colored light 951. With respect to the wide-wavelength spectrum of the band-pass filter 31, the high energy peaks of 550 nm wavelength of green light and 570 nm wavelength of yellow light shown in FIG. 1 are allowed to penetrate the band-pass filter 31 and are directly output to the following phase plate 923. Based on the description above, it is understood that the light-filtering unit 3 presently is defined in the first status, allowing for penetration of the wide-wavelength spectrum, i.e. the high energy peak of 550 nm wavelength is allowed to penetrate the light-filtering unit 3. Thus, the brightness output of the projecting system 9b is increased, forming the high brightness output.

When the output mode of the projecting system 9b determined by the user is changed to the precise-color output mode from the high-brightness output mode, the coupling element 42 driven by the driving element 43 is rotated, moving the end 421 thereof along the slot 412 of the frame 41 to stay away from the supporting portion 411 of the frame 41, thereby causing the frame 41 not to be perpendicular to the light path of the first colored light 951. That is, the normal line N of the band-pass filter 31 is parallel to the light path of the first colored light 951 when the light-filtering unit 1 is in the first status, and the normal line N of the band-pass filter 31 is not parallel to the light path of the first colored light 951 when the light-filtering unit 1 is in the second status. In FIG. 6, an angle θ, ranging from 20 to 30 degrees, is formed between the normal line N of the band-pass filter 31 and the light path of the first colored light 951 when the light-filtering unit 1 is in the second status, and the permeable range for the first colored light 951 with respect to the band-pass filter 31 is shifted to the narrow-wavelength spectrum from the wide-wavelength spectrum, which is provided when the frame 41 is perpendicular to the light path of the first colored light 951.

That is, when the band-pass filter 31 is changed to a perpendicular state from a non-perpendicular state with respect to the light path of the first colored light 951, the penetrable wavelength range for the first colored light 951 to the band-pass filter 31 is gradually shifted toward the narrow-wavelength spectrum from the wide-wavelength spectrum with the increasing angle θ. For example, when the angle θ is increased to 27.5 degree from 0 degree, the narrow-wavelength spectrum is shifted to the wide-wavelength spectrum. Finally, only the high energy peak of 550 nm wavelength of green light can pass the band-pass filter 31 and are directly output to the following phase plate 923.

Based on the description above, it is understood that the light-filtering unit 1 presently is defined in the second status, allowing for penetration of the narrow-wavelength spectrum, i.e. the high energy peak of 550 nm wavelength is allowed to penetrate the light-filtering unit 3, thus purifying the green light output of the projecting system 9b and obtaining precise color output while incorporating with other colored lights.

Thus, it is understood that the light-filtering units 1 and 3 of the light-filtering modules of the described embodiments can be switched between the first status capable of allowing penetration of the wide-wavelength spectrum and the second status capable of allowing penetration of the narrow-wavelength spectrum by the controlled driving units 2 and 4. When the light-filtering units 1 and 3 are in the second status, the narrow-wavelength spectrum is allowed to penetrate the light-filtering units 1 and 3, and only the high energy peak of green light within the first colored light 951 is allowed to penetrate the light-filtering units 1 and 3 and is provided with the precise wavelength, thus obtaining precise color output while incorporating with other colored lights. Thus, the conversion of the high-brightness output mode and precise-color output mode is obtained by the light-filtering module applied in the projecting system.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light-filtering module applied in a projecting system comprising a first colored light, comprising:
   a light-filtering unit located at a light path of the first colored light; and
   a driving unit comprising a coupling element coupled to the light-filtering unit and a driving element utilized to drive the coupling element;
   wherein the driving element drives the light-filtering unit to be switched between a first status and a second status by the coupling element, and a wide-wavelength spectrum and a narrow-wavelength spectrum are provided when the light-filtering unit is in the first and second statuses, respectively.

2. The light-filtering module as claimed in claim 1, wherein the light-filtering unit comprises a front light filtering sheet providing a first wavelength range spectrum and a rear light filtering sheet providing a second wavelength range spectrum.

3. The light-filtering module as claimed in claim 2, wherein the first wavelength range of the first wavelength spectrum is wider than the second wavelength range of the second wavelength spectrum.

4. The light-filtering module as claimed in claim 3, wherein the driving element of the light-filtering unit is coupled to the rear light filtering sheet, and the rear light filtering sheet is removed from the light path of the first colored light by the coupling element when the light-filtering unit is in the first status.

5. The light-filtering module as claimed in claim 4, wherein the driving unit further comprises a frame provided for installation of the rear light filtering sheet, the coupling element is a gear rack disposed on the frame, the driving element of the driving unit motionally drives the coupling element, and the driving element of the driving unit is connected to a gear engaged to the gear rack.

6. The light-filtering module as claimed in claim 5, wherein the coupling element is rotatably driven by the driving element.

7. The light-filtering module as claimed in claim 1, wherein the light-filtering unit comprises a band pass filter.

8. The light-filtering module as claimed in claim 7, wherein the band-pass filter comprises a normal line, the normal line of the band-pass filter is perpendicular to the light path of the first colored light when the light-filtering unit is in the first status, and the normal line of the band-pass filter is not perpendicular to the light path of the first colored light when the light-filtering unit is in the second status.

9. The light-filtering module as claimed in claim 8, wherein the normal line of the band-pass filter is angled with the light path of the first colored light from 20 to 30 degrees when the light-filtering unit is in the second status.

10. The light-filtering module as claimed in claim 8, wherein the driving unit further comprises a frame provided for installation of the rear light filtering sheet, and the coupling element is a cam lever coupled to the frame and driven by the driving element to be reciprocally rotated.

11. A projecting system, comprising:
a light-source module outputting a light beam;
a dichroic mirror dividing the light beam into a first colored light and a dual colored light;
a light-filtering unit located at a light path of the first colored light; and
a driving unit, comprising:
a coupling element coupled to the light-filtering unit; and
a driving element utilized to drive the coupling element, wherein the driving element drives the light-filtering unit to be switched between a first status and a second status by the coupling element, providing a wide-wavelength spectrum and a narrow-wavelength spectrum, respectively.

12. The projecting system as claimed in claim 11, further comprising a first image unit providing the first colored light with image information, wherein the light-filtering unit is located between the dichroic mirror and the first image unit.

13. The projecting system as claimed in claim 12, wherein the light-filtering unit comprises a front light filtering sheet to be penetrated by a first wavelength range spectrum and a rear light filtering sheet to be penetrated by a second wavelength range spectrum.

14. The projecting system as claimed in claim 13, wherein the first wavelength range of the first wavelength spectrum is wider than the second wavelength range of the second wavelength spectrum.

15. The projecting system as claimed in claim 14, wherein the driving element drives the rear light filtering sheet to be linearly moved via the coupling element to remove the rear light filtering sheet from the light path of the first colored light when the light-filtering unit is in the first status.

16. The projecting system as claimed in claim 15, wherein the driving unit further comprises a frame provided for installation of the rear light filtering sheet, the coupling element is a gear rack disposed on the frame, the driving element is a motor utilized to drive the coupling element to be reciprocally moved, and the motor is connected to a gear engaged to the gear rack.

17. The projecting system as claimed in claim 12, wherein the light-filtering unit comprises a band-pass filter.

18. The projecting system as claimed in claim 17, wherein the band-pass filter comprises a normal line, the normal line of the band-pass filter is parallel to the light path of the first colored light when the light-filtering unit is in the first status, and the normal line of the band-pass filter is not parallel to the light path of the first colored light when the light-filtering unit is in the second status.

19. The projecting system as claimed in claim 18, wherein the normal line of the band-pass filter is angled with the light path of the first colored light from 20 to 30 degrees when the light-filtering unit is in the second status.

20. The projecting system as claimed in claim 19, wherein the driving unit further comprises a frame provided for installation of the rear light filtering sheet, and the coupling element is a cam lever coupled to the frame and driven by the driving element to be reciprocally rotated.

* * * * *